(12) United States Patent
Lyle et al.

(10) Patent No.: US 6,363,389 B1
(45) Date of Patent: Mar. 26, 2002

(54) TECHNIQUE FOR CREATING A UNIQUE QUASI-RANDOM ROW IDENTIFIER

(75) Inventors: Robert William Lyle, Morgan Hill; Jay A. Yothers, Gilroy, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,286

(22) Filed: May 28, 1999

Related U.S. Application Data

(60) Provisional application No. 60/101,729, filed on Sep. 24, 1998.

(51) Int. Cl.[7] .............................................. G06F 17/30
(52) U.S. Cl. .............................. 707/100; 707/1; 707/2; 707/3; 707/4; 707/5; 707/6; 707/9; 709/201
(58) Field of Search ............................ 707/10, 101, 1, 707/2, 3, 4, 5, 6, 9, 100; 709/201

(56) References Cited

U.S. PATENT DOCUMENTS

| | | | |
|---|---|---|---|
| 4,509,119 A | 4/1985 | Gumaer et al. | 711/136 |
| 4,949,388 A | 8/1990 | Bhaskaran | 382/159 |
| 4,961,134 A | 10/1990 | Crus et al. | 707/8 |
| 5,043,866 A | 8/1991 | Myre, Jr. et al. | 707/202 |
| 5,222,235 A | 6/1993 | Hintz et al. | 707/101 |
| 5,247,672 A | 9/1993 | Mohan | 711/152 |
| 5,261,088 A | 11/1993 | Baird et al. | 707/206 |
| 5,291,583 A | 3/1994 | Bapat | 717/5 |
| 5,295,188 A | 3/1994 | Wilson et al. | 380/30 |
| 5,396,623 A | 3/1995 | McCall et al. | 707/101 |
| 5,408,654 A | 4/1995 | Barry | 707/101 |
| 5,416,915 A | 5/1995 | Mattson et al. | 711/114 |
| 5,418,921 A | 5/1995 | Cortney et al. | 711/114 |
| 5,418,940 A | 5/1995 | Mohan | 714/5 |
| 5,435,004 A | 7/1995 | Cox et al. | 707/205 |
| 5,452,299 A | 9/1995 | Thessin et al. | 370/260 |
| 5,455,944 A | 10/1995 | Haderle et al. | 435/28 |
| 5,517,641 A | 5/1996 | Barry et al. | 707/101 |
| 5,566,329 A | 10/1996 | Gainer et al. | 707/4 |
| 5,579,499 A | 11/1996 | Fecteau et al. | 711/209 |
| 5,579,515 A | 11/1996 | Hintz et al. | 707/7 |

(List continued on next page.)

FOREIGN PATENT DOCUMENTS

JP    8-167852    6/1996

OTHER PUBLICATIONS

IBM Technical Disclosure Bulletin, "Method For Storing Large Objects in a Relational Database," vol. 35, No. 4A, pp. 72–75, Sep. 1992.
IBM Technical Disclosure Bulletin, "Reorganization Flags For Table Indexes," vol. 35, No. 5, pp. 156–157, Oct. 1992.
IBM Technical Disclosure Bulletin, "Technique to Allow DB2 Utilities and Commands to Run While SQL Applications Have a Table Space Locked," vol. 36, No. 09A, pp. 499–501, Sep. 1993.
IBM Technical Disclosure Bulletin, "Spanning Temporary Reorg Files," vol. 36, N. 06Am o, 159, Jun. 1993.
IBM Technical Disclosure Bulletin, "Segmented Relational Database Tables," vol., 38, No. 07, pp. 219–220, Jul. 1995.

(List continued on next page.)

*Primary Examiner*—John Breene
*Assistant Examiner*—Cheryl Lewis
(74) *Attorney, Agent, or Firm*—Sughrue Mion, PLLC

(57) ABSTRACT

The present invention discloses a method, apparatus, and article of manufacture for generating a row identification number within a computer. In accordance with the present invention, the row identification number is associated with a row in a database. The database is stored on a data storage device connected to a computer. A unique row identification number is created by using a computer-dependent timestamp. The unique row identification number is manipulated so that the row identification number is quasi-random.

30 Claims, 10 Drawing Sheets

U.S. PATENT DOCUMENTS

| | | | | |
|---|---|---|---|---|
| 5,630,093 | A | | 5/1997 | Holzhammer et al. ...... 711/115 |
| 5,666,560 | A | | 9/1997 | Moertl et al. .................. 710/68 |
| 5,684,986 | A | | 11/1997 | Moertl et al. ................ 707/101 |
| 5,687,343 | A | | 11/1997 | Fecteau et al. ............. 711/202 |
| 5,721,827 | A | * | 2/1998 | Logan et al. ................ 709/217 |
| 5,721,915 | A | | 2/1998 | Sockut et al. ............... 707/200 |
| 5,727,197 | A | | 3/1998 | Burgess et al. ................. 707/2 |
| 5,732,402 | A | | 3/1998 | Lehman ....................... 707/205 |
| 5,737,601 | A | | 4/1998 | Jain et al. ................... 74/502.4 |
| 5,742,806 | A | | 4/1998 | Reiner et al. ................... 707/3 |
| 5,742,810 | A | | 4/1998 | Ng et al. ........................ 707/4 |
| 5,758,357 | A | | 5/1998 | Barry et al. ................ 707/202 |
| 5,761,667 | A | | 6/1998 | Koeppen .................... 707/101 |
| 5,767,155 | A | * | 6/1998 | Nakamura .................... 707/10 |
| 6,151,604 | A | * | 11/2000 | Wlaschin et al. ............. 707/10 |

OTHER PUBLICATIONS

IBM Technical Disclosure Bulletin, "Mapping a Relational Database to a Hierarchical File System," vol. 38, No. 10, pp. 309–311, Oct. 1995.

IBM Technical Disclosure Bulletin, "Fine Granularity Locking to Support High Data Availablity in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. 156–165, Jan. 1996.

MJ Carey, et al., "Object And File Management in The Exodus Extensible Database System," Proceedings of Very Large Data Bases. Twelfth International Conference on Very Large Data Bases, Kyoto, Japan, pp. 91–100, Aug. 25–28, 1986.

ML McAuliffe, et al., "Towards Effective and Efficient Free Space Management," 1996 ACM SIGMOD International Conference on Management of Data, Montreal, Quebec, Canada, Jun. 4–6, 1996.

C. Mohan, "Disk Read–Write Optimizations and Data Integrity in Transaction Systems Using Write–Ahead Logging," Proceedings of the Eleventh International Conference on Data Engineering (Cat. No. 95CH35724), Taipei, Taiwan, Mar. 6–10, 1995.

Ki Sik Pang, et al., "An Efficient Recovery Scheme For Large Data in Multimedia DBMS," Journal of the Korea Information Science Society, vol. 22, No. 2, pp. 206–217, Feb. 1995.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994.

Martin Marshall, "Time Warner Big on Oracle Objects. (Testing Oracle 8's Ability to Move Large Object Blocks)," (Company Operations), (Brief Article), CommunicationsWeek Issue: n676, pp. 1–3, Aug. 11, 1997.

HweeHwa Pang, "Tertiary Storage in Multimedia Systems: Staging or Direct Access?", Multimedia System, vol. 5, Issue: 6, pp. 386–399, Dec. 1, 1997.

Dr. Michael Stonebraker, "The Empire Strikes Back: DB2 Universal Database," http://www.oreview.com/9704side-.htm, pp. 1–7, 1997.

GH Sokut, "A Method For On–Line Reorganization of a Database," IBM Systems Journal, vol.. 36, No. 3 pp. 411–436, 1997.

H. Koide, et al., "A New Memory Allocation Method For Shared Memory Multiprocessors With Large Virtual Address Space," Concurrency: Practice and Experience, vol. 9, No. 9, pp. 897–914, Sep. 1997.

* cited by examiner

FIG. 3

| TOD-Clock Bit | Stepping Interval | | | |
|---|---|---|---|---|
| | Days | Hours | Min. | Seconds |
| 51 | | | | 0.000 001 |
| 47 | | | | 0.000 016 |
| 43 | | | | 0.000 256 |
| 39 | | | | 0.004 096 |
| 35 | | | | 0.065 536 |
| 31 | | | | 1.048 576 |
| 27 | | | | 16.777 216 |
| 23 | | | 4 | 28.435 456 |
| 19 | | 1 | 11 | 34.967 296 |
| 15 | | 19 | 5 | 19.476 736 |
| 11 | 12 | 17 | 25 | 11.627 776 |
| 7 | 203 | 14 | 43 | 6.044 416 |
| 3 | 3257 | 19 | 29 | 36.710 656 |

FIG. 4

| | Year | Mth | Day | Leap Sec | Clock Setting (Hex) | | | |
|---|---|---|---|---|---|---|---|---|
| 402 → | | | | | | | | ← 400 |
| | 1900 | 1 | 1 | | 0000 | 0000 | 0000 | 0000 |
| 404 → | 1972 | 1 | 1 | | 8126 | D60E | 4600 | 0000 |
| | 1972 | 7 | 1 | 1 | 820B | A981 | 1E24 | 0000 |
| | 1973 | 1 | 1 | 2 | 82F3 | 00AE | E248 | 0000 |
| | 1974 | 1 | 1 | 3 | 84BD | E971 | 146C | 0000 |
| | 1975 | 1 | 1 | 4 | 8688 | D233 | 4690 | 0000 |
| | 1976 | 1 | 1 | 5 | 8853 | BAF5 | 78B4 | 0000 |
| | 1977 | 1 | 1 | 6 | 8A1F | E595 | 20D8 | 0000 |
| | 1978 | 1 | 1 | 7 | 8BEA | CE57 | 52FC | 0000 |
| | 1979 | 1 | 1 | 8 | 8DB5 | B719 | 8520 | 0000 |
| | 1980 | 1 | 1 | 9 | 8F80 | 9FDB | B744 | 0000 |
| | 1981 | 7 | 1 | 10 | 9230 | 5C0F | CD68 | 0000 |
| | 1982 | 7 | 1 | 11 | 93FB | 44D1 | FF8C | 0000 |
| | 1983 | 7 | 1 | 12 | 95C6 | 2D94 | 31B0 | 0000 |
| | 1985 | 7 | 1 | 13 | 995D | 40F5 | 17D4 | 0000 |
| | 1988 | 1 | 1 | 14 | 9DDA | 69A5 | 57F8 | 0000 |
| | 1990 | 1 | 1 | 15 | A171 | 7D06 | 3E1C | 0000 |
| | 1991 | 1 | 1 | 16 | A33C | 65C8 | 7040 | 0000 |
| | 1992 | 7 | 1 | 17 | A5EC | 21FC | 8664 | 0000 |
| | 1993 | 7 | 1 | 18 | A7B7 | 0ABE | B888 | 0000 |
| | 1994 | 7 | 1 | 19 | A981 | F380 | EAAC | 0000 |
| | 1996 | 1 | 1 | 20 | AC34 | 336F | ECD0 | 0000 |
| 408 → | 1997 | 7 | 1 | 21 | AEE3 | EFA4 | 02F4 | 0000 |

| Interval | Clock Units(Hex) | | |
|---|---|---|---|
| 1 microsecond | | | 1000 |
| 1 millisecond | | 3E | 8000 |
| 1 second | | F424 | 0000 |
| 1 minute | 39 | 3870 | 0000 |
| 1 hour | D69 | 3A40 | 0000 |
| 1 day | 1 41DD | 7600 | 0000 |
| 365 days | 1CA E8C1 | 3E00 | 0000 |
| 366 days | 1CC 2A9E | B400 | 0000 |
| 1,461 days* | 72C E4E2 | 6E00 | 0000 |

\* Number of days in four years, including a leap year. Note that the year 1900 was not a leap year. Thus, the four-year span starting in 1900 has only 1,460 days.

FIG. 9

| TIME (ms) | 44 | 45 | 46 | 47 | 48 | 49 | 50 | 51 | DECIMAL DIGIT |
|---|---|---|---|---|---|---|---|---|---|
| 0 | 0 | 0 | 0 | 0 | 0 | 0 | 0 | 0 | 0 (Part 1) |
| 1 | 0 | 0 | 0 | 0 | 0 | 0 | 0 | 1 | 128 (Part 129) |
| 2 | 0 | 0 | 0 | 0 | 0 | 0 | 1 | 0 | 64 (Part 65) |
| 3 | 0 | 0 | 0 | 0 | 0 | 0 | 1 | 1 | 192 (Part 193) |
| 4 | 0 | 0 | 0 | 0 | 0 | 1 | 0 | 0 | 32 (Part 33) |
| 5 | 0 | 0 | 0 | 0 | 0 | 1 | 0 | 1 | 160 (Part 161) |
| 6 | 0 | 0 | 0 | 0 | 0 | 1 | 1 | 0 | 96 (Part 97) |
| 7 | 0 | 0 | 0 | 0 | 0 | 1 | 1 | 1 | 224 (Part 225) |

US 6,363,389 B1

TECHNIQUE FOR CREATING A UNIQUE QUASI-RANDOM ROW IDENTIFIER

PROVISIONAL APPLICATION

This application claims the benefit of U.S. Provisional Application No. 60/101,729, entitled "IMPROVED DATABASE SYSTEM," filed on Sep. 24, 1998, by Charles R. Bonner et al., which is incorporated by reference herein.

CROSS-REFERENCE TO RELATED APPLICATIONS

This application is related to the following co-pending and commonly-assigned patent applications:

Application Ser. No. 09/322,312, entitled "USING AN EPOCH NUMBER TO OPTIMIZE ACCESS WITH ROWID COLUMNS AND DIRECT ROW ACCESS," filed on same date herewith, by Robert W. Lyle et al., pending;

Application Ser. No. 09/321,675, entitled "A FAST TECHNIQUE FOR RECOVERING AN INDEX ON AN AUXILIARY TABLE," filed on same date herewith, by Robert W. Lyle et al., pending;

Application Ser. No. 09/322,292, entitled "STORING AN UNCOMPRESSED DATA LENGTH IN A LOB MAP TO SPEED SUBSTRING ACCESS WITHIN A LOB VALUE," filed on same date herewith, by Robert W. Lyle et al., pending;

Application Ser. No. 09/322,287, entitled "A TECHNIQUE TO AVOID PROCESSING WELL CLUSTERED LOB'S DURING REORGANIZATION OF A LOB TABLE SPACE," filed on same date herewith, by Charles R. Bonner et al., pending;

Application Ser. No. 09/322,317, entitled "AN OPTIMIZED TECHNIQUE FOR PREFETCHING LOB TABLE SPACE PAGES," filed on same date herewith, by Charles R. Bonner et al., pending;

Application Ser. No. 09/322,698, entitled "A TECHNIQUE FOR DETERMINING AN AGE OF AN OLDEST READING TRANSACTION WITHIN A DATABASE OBJECT," filed on same date herewith, by Robert W. Lyle et al., pending;

Application Ser. No. 09/372,315, entitled "AN EFFICIENT TECHNIQUE TO DEFER LARGE OBJECT ACCESS WITH INTERMEDIATE RESULTS," filed on same date herewith, by Christine M. Lee et al., abandoned; and Application Ser. No. 09/322,316, U.S. Pat. No. 6,144,970, entitled "A TECHNIQUE FOR INPLACE REORGANIZATION OF A LOB TABLE SPACE," filed on same date herewith, by Charles R. Bonner et al.;

each of which is incorporated by reference herein.

BACKGROUND OF THE INVENTION

1. Field of the Invention

This invention relates in general to computer-implemented database management systems, and, in particular, to generating unique quasi-random row identifiers that can be used as database partitioning keys.

2. Description of Related Art

A database is a collection of stored data that is organized as tables. A table consists of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

In a distributed or parallel database, the data in a table can be contained in one or more database partitions. When a table is on multiple partitions, some of its tuples may be stored in one partition and some of its tuples may be stored in other partitions. Such a division of a table is called horizontal partitioning. Vertical partitioning occurs when columns are distributed among partitions. A key for identifying each local table is called a partitioning key. Computer users typically select the value of the partitioning key and perform the initial distribution of data amongst the partitions. Over time, the distribution of data may become unbalanced among the partitions. For example, some partitions may become too large, nearly exceeding their maximum size limit, and other partitions may contain small amounts of data and a great deal of unused space.

Therefore, there is a need for an improved database management system that can create partitioning keys and use those keys to evenly distribute data among partitions.

SUMMARY OF THE INVENTION

To overcome the limitations in the prior art described above, and to overcome other limitations that will become apparent upon reading and understanding the present specification, the present invention discloses a method, apparatus, and article of manufacture for generating a row identification number within a computer.

In accordance with the present invention, the row identification number is associated with a row in a database. The database is stored on a data storage device connected to a computer. A unique row identification number is created by using a computer-dependent timestamp. The unique row identification number is manipulated so that the row identification number is quasi-random.

BRIEF DESCRIPTION OF THE DRAWINGS

Referring now to the drawings in which like reference numbers represent corresponding parts throughout:

FIG. 3 illustrates how various bit positions of the TOD clock are stepped;

FIG. 4 shows exemplary TOD clock settings that could be used in accordance with the present invention;

FIG. 5 shows various time intervals in clock units expressed in hexadecimal clock units;

FIG. 9 is an example of the first byte of a ROWID value; and

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
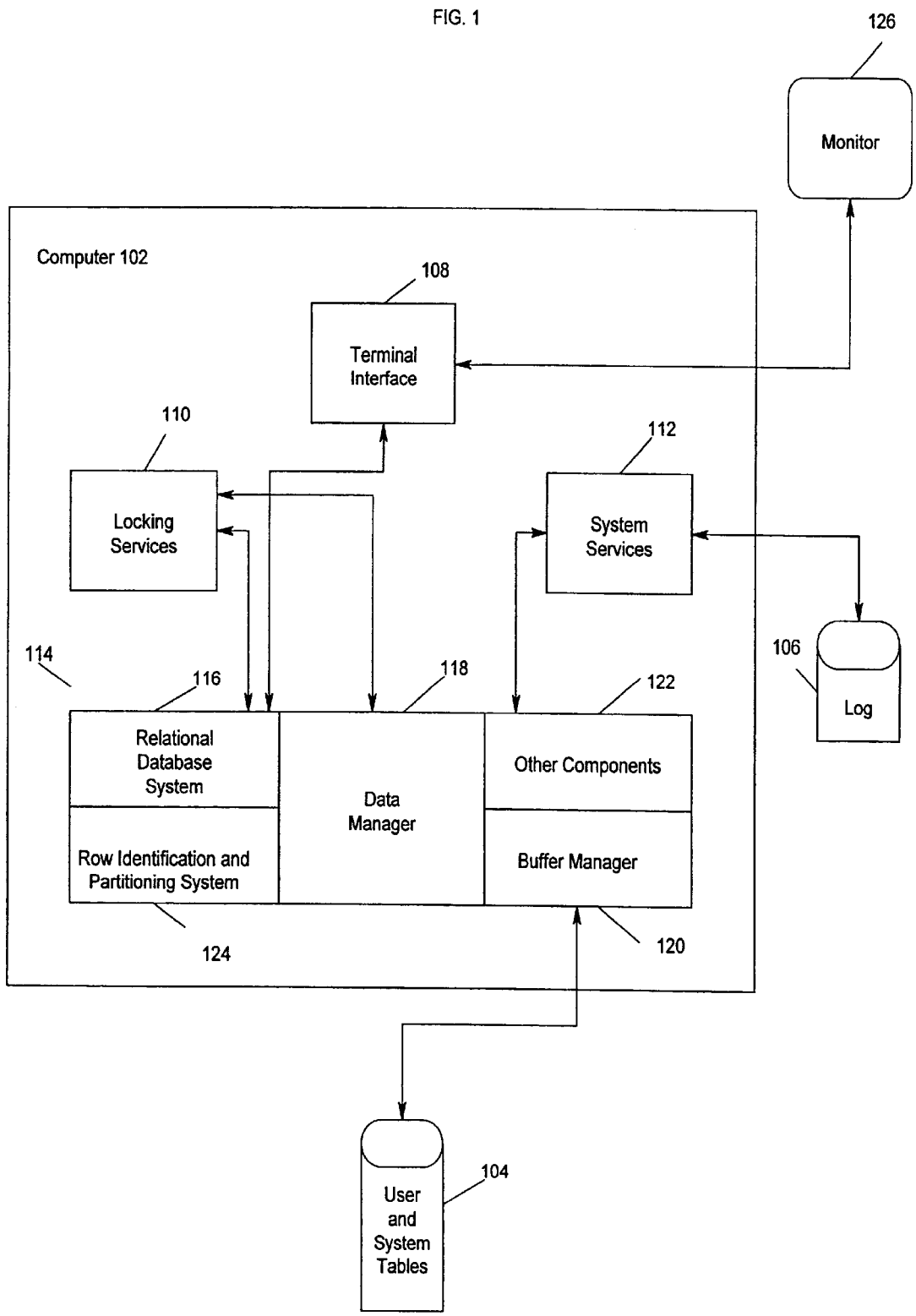
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the OS/390® operating system. Those skilled in the art will recognize, however, that the present invention has application to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus, concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Row Identification and Partitioning System ("RIP system") 124, and other components 122 such as an SQL compiler/interpreter. These submodules support the functions of the SQL language, i.e. definition, access control, interpretation, compilation, database retrieval, and update of user and system data. The RIP system 124 works in conjunction with the other submodules to create unique quasi-random row identification numbers.

The present invention is generally implemented using SQL statements executed under the control of the Database Services module 114. The Database Services module 114 retrieves or receives the SQL statements, wherein the SQL statements are generally stored in a text file on the data storage device 104 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Creating Unique Quasi-Random Row Identification Numbers

The disclosed embodiment of the present invention provides a RIP system 124 for generating unique quasi-random row identifiers. There are three aspects to the invention. One aspect is directed to generating unique quasi-random row identifiers ("ROWID"). A second aspect is directed to using the ROWIDs to partition a database table. A third aspect is directed to using the ROWID to determine the time at which a row was inserted into a database.

ROWIDs are data types that represent unique identifiers for each row in a database table. Unique quasi-random ROWIDs are ideal database partitioning keys because their random values can be used to evenly spread database rows across database partitions. Unique ROWIDs may also be used to determine the time at which a particular row was inserted into a database and, thus, may help a user perform efficient rollback operations.

Timestamp Overview

The RIP system 124 generates unique quasi-random ROWIDs by using a unique computer-dependent timestamp value and unique computer-dependent information. A DB2 OS/390 Mainframe offered by International Business Machines Corp. in Armonk, N.Y., is used herein to demonstrate how the RIP system 124 can be implemented. It is to be understood that other systems may be utilized without departing from the scope of the present invention.

Figure 2:
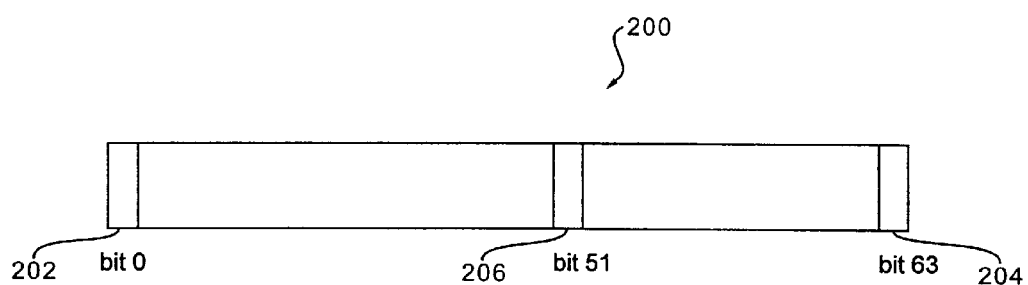
FIG. 2 is a conventional TOD clock value format that could be used in accordance with the present invention.

The timestamp value is related to the time-of-day ("TOD") clock value. Prior to discussing the use of the timestamp value to generate unique quasi-random ROWIDs, the TOD clock value will be discussed in further detail. The TOD clock value 200 is a binary counter with the format shown in FIG. 2. The bit positions of the TOD clock value 200 are numbered from bit zero 202 to bit sixty-three 204. This format corresponds to the bit positions of a sixty-four bit unsigned binary integer. In the binary representation of the TOD value 200, the zero bit position 202 is the left most position. Each bit to the right is given the next successive bit number. Bit zero 202 is typically referred to as the most significant bit ("MSB"). The right most bit is referred to as the least significant bit ("LSB"). The resolution of the TOD value 200 varies with the speed of the processor.

In one form, the TOD clock value 200 is incremented by adding a one to bit fifty-one 206 every microsecond. In models having a higher or lower resolution, a different bit position is incremented at such a frequency that the rate of advancing the TOD clock value 200 is the same as if a one were added to bit fifty-one 206 every microsecond. The resolution of the TOD clock value 200 is such that the rate of incrementing the TOD clock value 200 is comparable to the instruction-execution rate of the model.

In this embodiment of the invention, it is assumed that all recent processors have resolutions to at least the microsecond level, i.e., bit fifty-one 206 of the TOD clock value 200. Therefore, with respect to the RIP system 124, bit zero 202 through bit fifty-one 206 are significant. Bits beyond bit fifty-one 206, while still essential to the uniqueness of the ROWID value, cannot be relied upon to change with time. It is to be understood that as processor speeds increase, the number of significant bits may be increased without departing from the scope of the present invention.

A TOD clock value 200 is said to be in a particular multiprocessing configuration if at least one of the central processing units ("CPU") which shares that clock is in the configuration. Thus, it is possible for a single TOD clock value 200 to be in more than one configuration. Conversely, if all CPUs having access to a particular TOD clock value 200 have been removed from a particular configuration, then the TOD clock value 200 is no longer considered to be in that configuration.

When more than one TOD clock value 200 exists in the configuration, the stepping rates are synchronized such that all TOD clock values 200 in the configuration are incremented at exactly the same rate. When incrementing the TOD clock value 200 causes a carry to be propagated out of bit zero 202, the carry is ignored, and counting continues from zero. The program is not alerted, and no interruption condition is generated as a result of the overflow.

The operation of a TOD clock is not affected by any normal activity or event in the system. Incrementing the clock does not depend on whether the wait-state bit of the processor status word ("PSW") is one or whether the CPU is in the operating, loaded, stopped, or check-stop state. Its operation is not affected by CPU, initial-CPU, clear resets or by initial program loading. Operation of the clock is also not affected by the setting of the rate control or by an initial-machine-loading operation. Depending on the model and the configuration, a TOD clock may or may not be powered independent of a CPU that accesses it. On some platforms (e.g., OS/390 Mainframes) the hardware ensures that all TOD clock values 200 are unique, including TOD clock values 200 on multiprocessors.

If the manual TOD-clock control of any CPU in the configuration is in the enable-set position, the clock can be set to a specific TOD clock value 200 by execution of a SET CLOCK instruction. Setting the clock replaces the TOD clock values 200 in all bit positions from bit position zero 202 through the rightmost position that is incremented when the clock is running. However, on some models, the rightmost bits starting at or to the right of bit fifty-two of the specified TOD clock value 200 are ignored, and zeros are placed in the corresponding positions of the clock. The TOD clock value 200 can be inspected by executing a STORE CLOCK instruction. The STORE CLOCK instruction causes a sixty-four-bit value to be stored. Two executions of the STORE CLOCK instruction possibly on different CPUs in the same configuration, always store different values when the clock is running. Alternatively, if separate clocks are accessed, both clocks are running and are synchronized.

The values stored for a running clock always correctly imply the sequence of execution of the STORE CLOCK instruction on one or more CPUs for all cases where the sequence can be established by means of the program. Zeros are stored in positions to the right of the bit position that is incremented. In a configuration with more than one CPU, however, when the value of a running clock is stored, nonzero values may be stored in positions to the right of the rightmost position that is incremented. This ensures that a unique value is stored.

In a configuration where more than one CPU accesses the same clock, the SET CLOCK instruction is interlocked such that the entire contents appear to be updated concurrently. That is, if the SET CLOCK instructions are executed simultaneously by two CPUs, the final result is either one or the other value. If the SET CLOCK instruction is executed on one CPU and the STORE CLOCK instruction is executed on the other CPU, the result obtained by the STORE CLOCK instruction is either the entire old value or the entire new value. Additionally, when the SET CLOCK instruction is executed on one CPU and the STORE CLOCK instruction is executed on another CPU, the STORE CLOCK instruction may find the clock in the stopped state even when the TOD-clock-sync-control bit is zero in each CPU. The TOD-clock-sync-control bit is bit two of control register zero. Since the clock enters the set state before incrementing, the first STORE CLOCK instruction executed after the clock enters the set state may still find the original value introduced by the SET CLOCK instruction.

The nine items listed below are provided to assist programmers that wish to use the TOD clock value 200 in accordance with the present invention.

1. Bit position thirty-one of the clock is incremented every 1.048576 seconds. For some applications, reference to the leftmost 32 bits of the clock may provide sufficient resolution.

2. Communication between systems is facilitated by establishing a standard time origin, or standard epoch, which is the calendar date and time to which a clock value of zero corresponds. Jan. 1, 1900, 0 a.m. Coordinated Universal Time (UTC) is recommended as the standard epoch for the clock. This is also the epoch used when the TOD clock is synchronized to the external time reference (ETR). Note that the former term, Greenwich Mean Time (GMT), is now obsolete and has been replaced with the more precise UTC.

3. A program using the clock value as a time-of-day and calendar indication must be consistent with the programming support under which the program is to be executed. If the programming support uses the standard epoch, bit zero 202 of the TOD clock value 200 remains one through the years 1972–2041. (Bit zero turned on at 11:56:53, 685248 (UTC) May 11, 1971.) Ordinarily, testing bit zero 202 for a one is sufficient to determine if the clock value is in the standard epoch.

4. In converting to or from the current date or time, the programming support must take into account that "leap seconds" have been inserted or deleted because of time-correction standards.

5. Because of the limited accuracy of manually setting the clock value, the rightmost bit positions of the clock, expressing fractions of a second, are normally not valid as indications of the time of day. However, they permit elapsed-time measurements of high resolution.

6. FIG. 3 shows the stepping time interval 300 between instants at which various TOD clock bit positions 302 of the TOD clock are stepped. This time value may also be considered as the weighted time value that the bit, when one, represents.

7. FIG. 4 shows the TOD clock setting for 00:00:00 (0 am) 400, UTC time, for setting 1900 402, for setting Jan. 1, 1972 404, and for that instant in time just after each of the 21 leap seconds 406 that will have occurred through July 1997 408. Each of these leap seconds was inserted at 23:59:60 UTC of the day previous to the one listed and ending at 00:00:00 UTC of the day.

8. The stepping value of TOD-clock bit position sixty-three, if implemented, is $2^{-12}$ microseconds picoseconds. This value is called a clock unit. FIG. 5 shows various time intervals 500 in clock units 502 expressed in hexadecimal clock units.

9. In a multiprocessing configuration, after the TOD clock is set and begins running, the program should delay activity for 220 microseconds (1.048576 seconds) to ensure that the CPU-timer, clock-comparator, and TOD-clock-sync-check interruption conditions are recognized by the CPU.

Unique Quasi-Random ROWIDs

Figure 6:
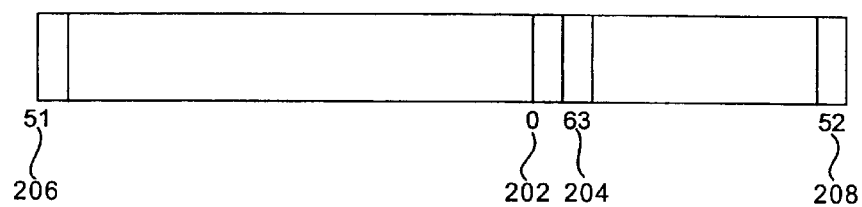
FIG. 6 is a manipulated TOD clock value format that could be used in accordance with the present invention.

The RIP system 124 manipulates the TOD clock value 200 to make it appear random. This manipulation involves reversing the order of the significant bits of the TOD clock value 200. As shown in FIG. 6, the reversing technique has two steps. In the first step, bit fifty-two 208 through bit sixty-three 204 of the TOD clock value 200 are moved to the left most position. Moving bit fifty-two 208 through bit sixty-three 204 in this manner shifts the significant bit zero 202 through bit fifty-one 206 to the right. In the second step, all bits are reversed. FIG. 6 represents the reversed bits.

By manipulating the TOD value 200 in this manner, the MSB (i.e., bit zero 202) will change every microsecond. Bit one will change every two microseconds, bit two will change every 4 microseconds, etc. If bit zero 202 is used as a partitioning key for a distributed or parallel database, the partition key value could potentially change every microsecond. It is to be understood that the frequency at which the partition key changes may be increased without departing from the scope of the present invention. That is, the number of significant bits may be increased to raise the frequency at which the partition key changes.

In an alternative embodiment of the present invention, the RIP system 124 uses unique computer-dependent information to create a unique quasi-random ROWID across different computers. Note, use of the computer-dependent information is not necessary when creating a unique quasi-random ROWID within a single computer.

The unique computer-dependent information may include a unique CPU identifier to ensure that the ROWIDs are both unique within the computer and unique among different computers. For example, the ESA/390 machines support an instruction, STIDP, that stores a unique CPU identifier. The identifier is 8 bytes long and is described as follows:

1 byte of version code 3 bytes of CPU Identification Number 2 bytes of Machine-Type Number 2 bytes unused (currently all zeroes).

All ROWIDs generated on a machine with the ESA/390 are unique when the CPU Identification Number and Machine Type number are a part of the ROWID. In the future, more bytes may be required to ensure uniqueness (i.e., if the unused bytes are used at some point in the future). A robust implementation could just include all eight bytes. However, for space saving purposes, the length of the additional CPU identifiers added to the ROWIDs can be minimized to six bytes. The ROWID implemented on the ESA/390 platform also includes a ROWID version type so that the format may be altered to allow for other types of unique identifiers in the future.

A similar approach for generating ROWIDs can be implemented on other architectures that support one of the following:

1. the hardware supports an instruction for retrieving a unique CPU identifier or serial number; and/or 2. the operating system supports a service that produces a unique instance or serial number; and/or 3. some other unique identifier is available to the RIP system.

Figure 7:
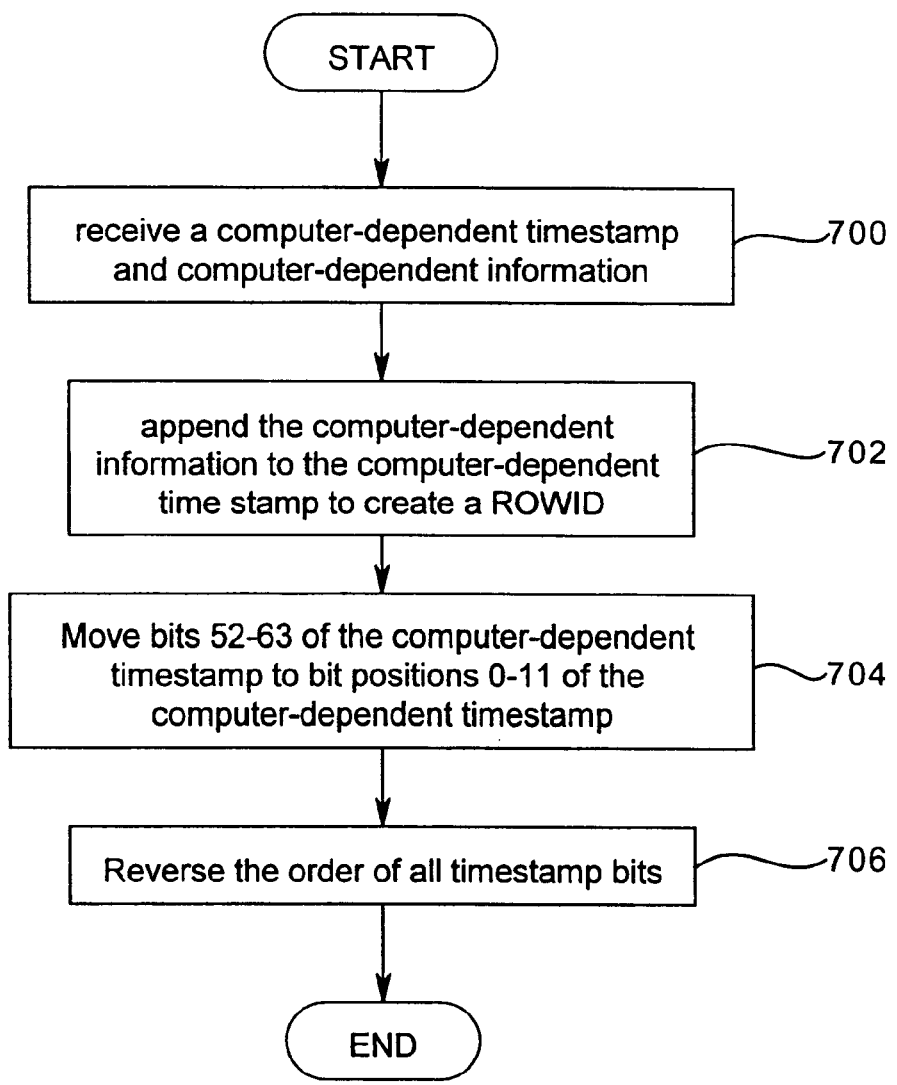
FIG. 7 is a flow diagram illustrating the steps performed to generate a unique quasi-random ROWID in accordance with an embodiment of the present invention

FIG. 7 is a flowchart illustrating the steps performed by the RIP system 124 when generating a unique quasi-random ROWID. Block 700 represents the RIP system 124 receiving a unique computer-dependent timestamp (i.e., TOD clock value 202) and unique computer-dependent information (i.e., a unique CPU identifier). Block 702 represents the RIP system 124 appending the computer-dependent information to the timestamp information to create a ROWID. The timestamp information is located in front of the computer-dependent information. Bits fifty-two through sixty-three of the time-stamp value are moved to the left most position (i.e., bit positions zero through eleven of the timestamp value) as represented by block 704. Accordingly, bits zero through fifty-one of the timestamp are shifted right. Block 706 represents the RIP system 124 reversing the order of all bits of the modified timestamp to create a unique quasi-random ROWID.

Using the Unique Quasi-Random ROWID to Partition

Once the ROWIDs are generated, the RIP system 124 may use them to partition a database table. This is especially helpful when the RIP system 124 is implemented within a network computer system. Within a network computer system, the RIP system 124 generates a ROWID for rows stored in each database partition. Each database partition may be stored on a different computer within the network computer system. The ROWIDs are both unique within a computer and unique among the computers in the network computer system.

To partition a database table, a user selects a portion of the unique quasi-random ROWID to use as a partitioning key. A portion of the ROWID or the complete ROWID is referred to as a high key value. Database rows, which have ROWIDs that are less than or equal to a high key value are stored with the next greater than or equal high key value. For example, if the high key value equals ten, database rows with values less than or equal to ten are stored in the partition which has that high key value. A user can use one byte for the high key value or the user may use multiple bytes for the high key value.

Figure 8:
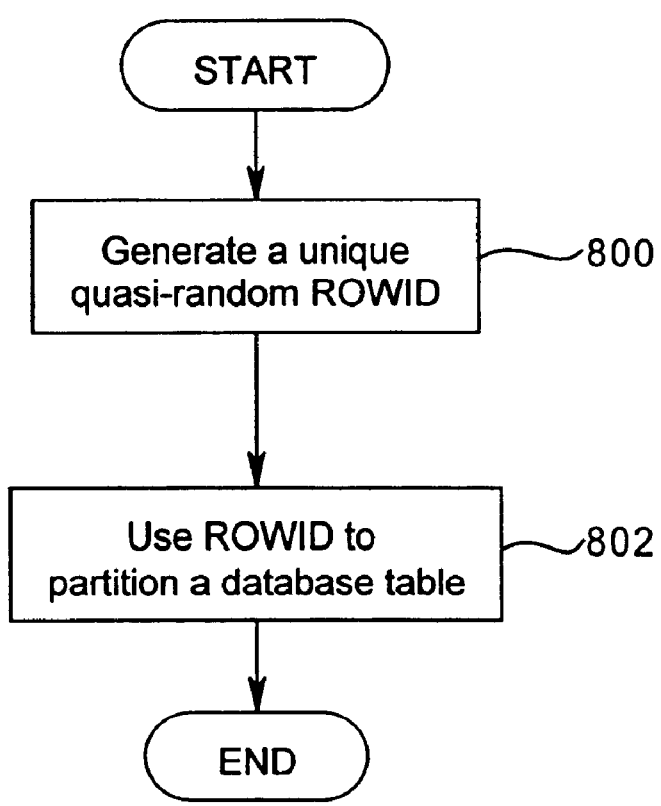
FIG. 8 is a flow diagram illustrating the steps performed to use a unique quasi-random ROWID as a database partitioning key in accordance with an alternative embodiment of the present invention.

FIG. 8 is a flow diagram that illustrates the steps performed by an embodiment of the present invention when using a unique quasi-random ROWID to partition a database table. Block 800 represents the RIP system 124 generating the unique quasi-random ROWID. Block 802 represents the RIP system 124 using the unique quasi-random ROWID to partition the database To illustrate, assume the first byte of a ROWID is used as a partition key and assume that there are two hundred fifty-six partitions, numbered one through two hundred fifty-six. FIG. 9 shows examples of the first bytes of the ROWIDs (i.e., 934, 936, 938, 940, 942, 944, 946 and 948) generated by the RIP system 124. At time zero 902, the corresponding decimal digit 904 is zero and at time one 906 the corresponding decimal digit 908 is one hundred twenty-eight. Other values include: at time two 910 the corresponding decimal digit 912 is sixty-four; at time three 914 the corresponding decimal digit 916 is one hundred ninety-two; at time four 918 the corresponding decimal digit 920 is thirty-two; at time five 922 the corresponding decimal digit is 924 is one hundred sixty; at time six 926 the corresponding decimal digit 928 is ninety-six; and at time seven 930 the corresponding decimal digit 932 is two hundred twenty-four.

As shown, the RIP system 124 creates values that jump around very rapidly. Over time, the values change in a pattern. However, if a user inserts a row into a table at random times (i.e., 1000 inserts per second), the value appears somewhat random. A user can use this random value to partition a database table, as represented in FIG. 9. In particular, ROWIDs with a first byte value less than or equal to '00000000' 934 will be placed in partition one 950; ROWIDs with a first byte value greater than '01111111' and less than or equal to '10000000' 936 will be placed in partition one hundred twenty-nine 952; ROWIDs with a first byte value greater than '00111111' and less than or equal to '01000000' 938 will be placed in partition sixty-five 954; ROWIDs with a first byte value greater than '10111111' and less than or equal to '11000000' 940 will be placed in partition one hundred ninety-three 956; ROWIDs with a first byte value greater than '00011111' and less than or equal to '00100000' 942 will be placed in partition thirty-three 958; ROWIDs with a first byte value greater than '10011111' and less than or equal to '10100000' 944 will be placed in partition one hundred sixty-one 960; ROWIDs with a first byte value greater than '01011111' and less than or equal to '01100000' 946 will be placed in partition ninety-seven 962; ROWIDs with a first byte value greater than '11011111' and less than or equal to '11100000' 948 will be placed in partition two hundred twenty-five 964; and so on. If a batch insert application were running, inserting a new row every microsecond, then partitions would be loaded as represented in FIG. 9 (assuming that the starting TOD clock value 200 is encoded to a value beginning with 00000000). It is to be understood that the table may be divided into unequal parts without departing from the scope of the present invention.

Using the Unique Quasi-Random ROWID to Obtain a Row Insertion Time

Once the ROWIDs are generated, the RIP system 124 may use them to determine the time at which a row was inserted into a database table. Such information may help a user to determine the time at which a row was inserted in a database table. Since a computer-dependent timestamp (i.e., the TOD clock value 202) is contained within the ROWID, the RIP system 124 obtains the row insertion time from the ROWID. More specifically, the RIP system 124 determines the computer-dependent timestamp by undoing the bit manipulations discussed above.

Figure 10:
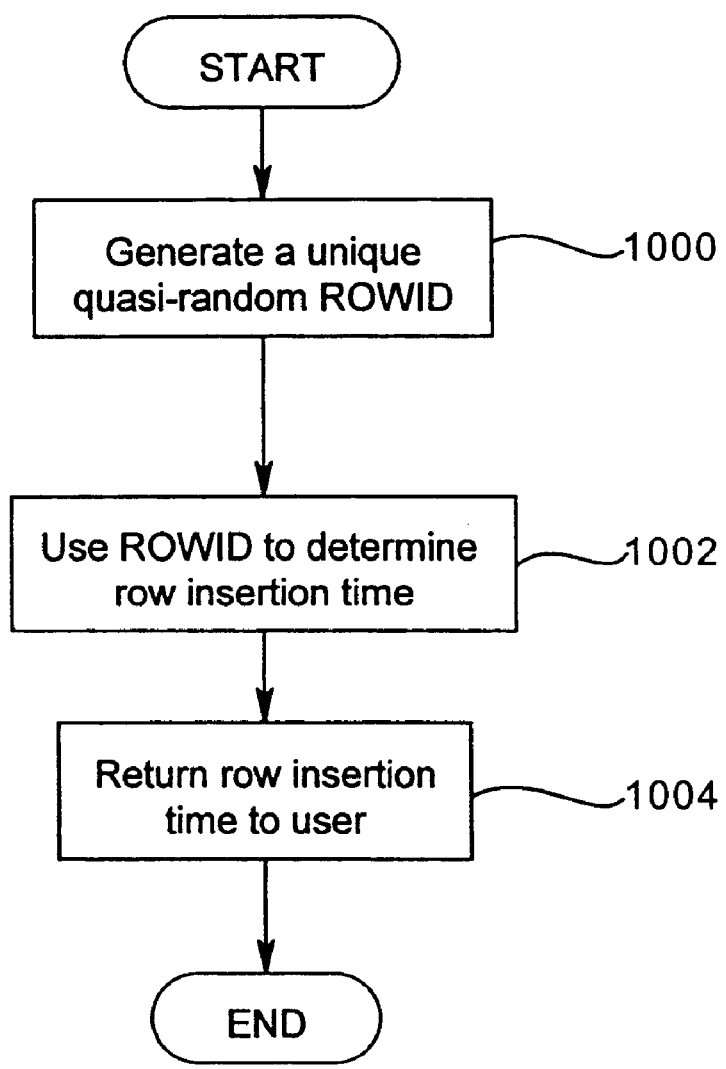
FIG. 10 is a flow diagram illustrating the steps performed to use a unique quasi-random ROWID to determine the time at which a row was inserted into a database in accordance with an alternative embodiment of the present invention.

FIG. 10 is a flow diagram that illustrates the steps performed by an embodiment of the present invention for determining the time at which a row was inserted into a database table. Block 1000 represents RIP system 124 generating a unique quasi-random ROWID. Block 1002 represents the RIP system using the unique quasi-random ROWID to determine the time at which a row was inserted into a database. Block 1004 represents the RIP system 124 returning the row insertion time to the user.

CONCLUSION

This concludes the description of the preferred embodiment of the invention. The following describes some alternative embodiments for accomplishing the RIP system 124. For example, any type of computer, such as a mainframe, minicomputer, or personal computer, or computer configuration, such as a timesharing mainframe, local area network, or standalone personal computer, could be used with embodiments of the RIP system 124.

In summary, a preferred embodiment of the RIP system 124 generates a unique quasi-random row identification number from a timestamp. The unique quasi-random row identification number can be used as a database partitioning key because of its somewhat random appearance. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of generating a row identification number within a computer, the row identification number being associated with a row in a database, wherein the database is stored on a data storage device connected to the computer, the method comprises:

creating a unique row identification number by using a computer-dependent timestamp; and manipulating the unique row identification number so that the row identification number is quasi-random.

2. The method of claim 1, wherein the computer-dependent timestamp comprises a plurality of bits having an order and wherein manipulating the unique row identification number further comprises:

reversing the order of a portion of the bits; and locating the reversed portion of the bits in front of a remaining portion of the bits.

3. The method of claim 1, wherein the method further comprises:

receiving computer dependent information; and appending the computer-dependent information to the computer-dependent timestamp to create the unique row identification number.

4. The method of claim 3, wherein the computer-dependent timestamp is located in front of the computer-dependent information.

5. The method of claim 3, wherein the computer-dependent information comprises a central processing unit identification number.

6. The method of claim 3, wherein the computer-dependent information comprises a machine-type number.

7. The method of claim 3, wherein the computer-dependent information comprises a version code.

8. The method of claim 3, wherein the computer is connected to a plurality of computers, and wherein each computer has rows having row identification numbers, and wherein each row identification number is unique among the plurality of computers.

9. The method of claim 1, wherein the method further comprises using the row identification number as a database partitioning key in a partitioned database.

10. The method of claim 1, wherein the method further comprises using the computer-dependent timestamp contained within the row identification number to determine a time at which a particular row was inserted into the database.

11. An apparatus for generating a row identification number within a computer, the row identification number being associated with a row in a database, comprising:

a computer having a data storage device connected thereto, wherein the data storage device stores the database; and one or more computer programs, performed by the computer, for creating a unique row identification number by using a computer-dependent timestamp, and manipulating the unique row identification number so that the row identification number is quasi-random.

12. The apparatus of claim 11, wherein the computer-dependent timestamp comprises a plurality of bits having an order and wherein the means for manipulating further comprises one or more computer programs, performed by the computer, for reversing the order of a portion of the bits, and locating the reversed portion of the bits in front of a remaining portion of the bits.

13. The apparatus of claim 11, further comprising one or more computer programs, performed by the computer, for receiving computer dependent information, and appending the computer-dependent information to the computer-dependent timestamp to create the unique row identification number.

14. The apparatus of claim 13, wherein the computer-dependent timestamp is located in front of the computer-dependent information.

15. The apparatus of claim 13, wherein the computer-dependent information comprises a central processing unit identification number.

16. The apparatus of claim 13, wherein the computer-dependent information comprises a machine-type number.

17. The apparatus of claim 13, wherein the computer-dependent information comprises a version code.

18. The apparatus of claim 13, wherein the computer is connected to a plurality of computers, and wherein each computer has rows having row identification numbers, and wherein each row identification number is unique among the plurality of computers.

19. The apparatus of claim 11, further comprising one or more computer programs, performed by the computer, for using the row identification number as a database partitioning key in a partitioned database.

20. The apparatus of claim 11, further comprising one or more computer programs, performed by the computer, for using the computer-dependent timestamp contained within the row identification number to determine a time at which a particular row was inserted into the database.

21. An article of manufacture comprising a computer program carrier readable by a computer and embodying one or more instructions executable by the computer to perform a method that generates a row identification number within a computer, the row identification number being associated with a row in a database, wherein the database is stored on a data storage device connected to the computer, the method comprises:

creating a unique row identification number by using a computer-dependent timestamp; and manipulating the unique row identification number so that the row identification number is quasi-random.

22. The article of manufacture of claim 21, wherein the computer-dependent timestamp comprises a plurality of bits having an order and wherein manipulating the unique row identification number further comprises:

reversing the order of a portion of the bits; and locating the reversed portion of the bits in front of a remaining portion of the bits.

23. The article of manufacture of claim 21, wherein the method further comprises:

receiving computer dependent information; and appending the computer-dependent information to the computer-dependent timestamp to create the unique row identification number.

24. The article of manufacture of claim 23, wherein the computer-dependent timestamp is located in front of the computer-dependent information.

25. The article of manufacture of claim 23, wherein the computer-dependent information comprises a central processing unit identification number.

26. The article of manufacture of claim 23, wherein the computer-dependent information comprises a machine-type number.

27. The article of manufacture of claim 23, wherein the computer-dependent information comprises a version code.

28. The article of manufacture of claim 23, wherein the computer is connected to a plurality of computers, and wherein each computer has rows having row identification numbers, and wherein each row identification number is unique among the plurality of computers.

29. The article of manufacture of claim 21, wherein the method further comprises using the row identification number as a database partitioning key in a partitioned database.

30. The article of manufacture of claim 21, wherein the method further comprises using the computer-dependent timestamp contained within the row identification number to determine a time at which a particular row was inserted into the database.

* * * * *